United States Patent
Powers et al.

(10) Patent No.: US 9,501,304 B1
(45) Date of Patent: Nov. 22, 2016

(54) LIGHTWEIGHT APPLICATION VIRTUALIZATION ARCHITECTURE

(71) Applicant: Architecture Technology Corporation, Minneapolis, MN (US)

(72) Inventors: Judson Powers, Ithaca, NY (US); Robert A. Joyce, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 14/741,388

(22) Filed: Jun. 16, 2015

(51) Int. Cl.
*G06F 17/30* (2006.01)
*H04N 7/16* (2011.01)
*G06F 9/455* (2006.01)
*H04L 29/08* (2006.01)
*G06F 21/62* (2013.01)
*G06F 21/60* (2013.01)
*G06F 1/00* (2006.01)

(52) U.S. Cl.
CPC ......... *G06F 9/45533* (2013.01); *G06F 21/606* (2013.01); *G06F 21/6218* (2013.01); *H04L 67/10* (2013.01)

(58) Field of Classification Search
CPC .............. G06F 21/10; G06F 21/6218; G11B 20/00086; H04L 2463/101
USPC ..................................................... 726/27–31
See application file for complete search history.

(56) References Cited

U.S. PATENT DOCUMENTS

| | | |
|---|---|---|
| 5,590,281 A | 12/1996 | Stevens |
| 6,513,057 B1 | 1/2003 | McCrory |
| 7,444,632 B2 | 10/2008 | Minor et al. |
| 8,271,987 B1 | 9/2012 | Willeford et al. |
| 8,281,311 B2 | 10/2012 | Barsness et al. |
| 8,347,291 B2 | 1/2013 | Marwinski |
| 8,375,374 B2 | 2/2013 | O'Brien et al. |
| 8,387,077 B1 | 2/2013 | Getlin et al. |
| 8,479,178 B2 | 7/2013 | Aharoni et al. |
| 8,543,992 B2 | 9/2013 | Jiang et al. |

(Continued)

OTHER PUBLICATIONS

Abdulla et al. "Lightweight Virtualization Based Security Enforcement in Mobile Devices." Center for Secure Information Systems George Mason University, http://cs.gmu.edu/~astavrou/courses/ISA_862_F10/lightvirt.pdf., retrieved on Jul. 27, 2015, 25 pp.

(Continued)

*Primary Examiner* — Evans Desrosiers
(74) *Attorney, Agent, or Firm* — Shumaker & Sieffert, P.A.

(57) ABSTRACT

An example method includes identifying a software package that is associated with a software application, wherein the software package includes platform-independent instructions that are configured to perform at least one computational task upon execution, and wherein the platform-independent instructions have a format that is not specific to any particular hardware platform. The method further includes selecting a computing system to perform the at least one computational task, providing, by the selected computing system, a container in which to perform the at least one computational task, obtaining, by the selected computing system, platform-dependent instructions that have been converted from the platform-independent instructions, wherein the platform-dependent instructions have a format that is specific to a hardware platform provided by the selected computing system, executing, by the selected computing system and in the container, the platform-dependent instructions to perform the at least one computational task.

27 Claims, 9 Drawing Sheets

(56) References Cited

U.S. PATENT DOCUMENTS

| | | | |
|---|---|---|---|
| 8,555,287 | B2 | 10/2013 | Ding et al. |
| 8,601,490 | B2 | 12/2013 | Sureshan et al. |
| 8,683,468 | B2 | 3/2014 | Breternitz et al. |
| 8,707,314 | B2 | 4/2014 | Gummaraju et al. |
| 8,782,645 | B2 | 7/2014 | Breternitz et al. |
| 8,924,539 | B2 | 12/2014 | Ferris et al. |
| 2011/0296390 | A1* | 12/2011 | Vidal .................. G06F 8/65 717/168 |
| 2012/0233486 | A1 | 9/2012 | Phull et al. |
| 2013/0047138 | A1* | 2/2013 | Radez .................. G06F 8/71 717/121 |

OTHER PUBLICATIONS

Russel, "Iguest: Implementing the little Linux hypervisor," IBM OzLabs, retrieved from http://landley.net/kdocs/ols/2007/ols2007v2, pp. 173-178.pdf, Jun. 27-30, 2007, 8 pp.

Mitasch, "Lightweight Virtualization: LXC Best Practices," LinuxCon Barcelona 2012, http://www.thomas-krenn.com/de/wikiDE/images/c/cf/20121106-Lighweight_Virtualization_LXC_Best_Practices.pdf, 28 pp.

"Introduction to Portable Native Client," The Chromium Projects, retrieved on Feb. 18, 2015, from http://www.chromium.org/nativeclient/pnacl/introduction-to-portable-native-client, 3 pp.

"NaCl and PNaCl," Google Chrome, retrieved on Feb. 18, 2015, from https://developer.chrome.com/native-client/nacl-and-pnacl, 4 pp.

"OpenShift," by Red Hat, retrieved on Feb. 18, 2015, from http://www.redhat.com/en/technologies/cloud-computing/openshift, 6 pp.

"OpenShift Platform as a Service (PaaS)," by Red Hat, retrieved on Feb. 18, 2015, from http://www.redhat.com/developers/openshift, 2 pp.

"Grand Central Dispatch (GCD) Reference," retrieved on Mar. 3, 2015, Apple Inc., from https://developer.apple.com/library/prerelease/ios/documentation/Performance/Reference/GCD_libdispatch_Ref/index.html, 6 pp.

"Grand Central Dispatch," Wikipedia, retrieved on Mar. 3, 2015, from http://en.wikipedia.org/wiki/Grand_Central_Dispatch, 6 pp.

"libc1c," OpenCL 1.1 Specification, retrieved on Apr. 27, 2015, from http://libc1c.llbm.org, 1 pp.

"The first open standard intermediate language for parallel compute and graphics," Khronos Group, retrieved on Apr. 27, 2015, from https://www.khronos.org/spir, 4 pp.

AF SBIR/STTR Award Details, Air Force, "LAVA: Lightweight Application Virtualization Architecture," Award Details (Start: Jun. 23, 2014, End: Mar. 23, 2015), http://www.afsbirsttr.com/award/AwardDetails.aspx?pk=21652, 2 pp.

* cited by examiner

LIGHTWEIGHT APPLICATION VIRTUALIZATION ARCHITECTURE

BACKGROUND

A cloud computing platform may be an attractive platform architecture for many applications, particularly because of its support for elastic scaling in response to changing loads. However, adoption of cloud computing may be hampered by reduced computing efficiency, higher management cost, and greater vulnerability to attack, as compared with the use of traditional, dedicated servers.

Cloud computing architectures are traditionally based on full or hardware-level virtualization techniques, providing cloud users with an easy path for migrating existing applications to a new environment. However, replicating the entirety of an operating system and emulating the hardware it runs on introduces many inefficiencies. While sophisticated hypervisors can mitigate some of the duplicated memory and storage needs, full virtualization remains inefficient at runtime and during "elastic" scaling operations by creating new instances in response to increased load. Full virtualization may also bring with it all the management headaches that may come with long-term operating system maintenance, including extensive configuration tasks and the potential need to apply regular security updates.

SUMMARY

In one example, a method includes, in a cloud computing platform comprising one or more computing systems, identifying a software package that is associated with a software application, wherein the software package includes platform-independent instructions that are configured to perform at least one computational task upon execution, and wherein the platform-independent instructions have a format that is not specific to any particular hardware platform provided by the one or more computing systems. The example method further includes selecting, from the one or more computing systems, a computing system to perform the at least one computational task, providing, by the selected computing system, a container in which to perform the at least one computational task, obtaining, by the selected computing system, platform-dependent instructions that have been converted from the platform-independent instructions, wherein the platform-dependent instructions have a format that is specific to a hardware platform provided by the selected computing system, executing, by the selected computing system and in the container, the platform-dependent instructions to perform the at least one computational task.

In one example, a cloud computing platform comprises one or more computing systems that include one or more processors. The one or more processors are configured to identify a software package that is associated with a software application, wherein the software package includes platform-independent instructions that are configured to perform at least one computational task upon execution, and wherein the platform-independent instructions have a format that is not specific to any particular hardware platform provided by the one or more computing systems, and to select, from the one or more computing systems, a computing system to perform the at least one computational task. The selected computing system provides a container in which to perform the at least one computational task, obtains platform-dependent instructions that have been converted from the platform-independent instructions, wherein the platform-dependent instructions have a format that is specific to a hardware platform provided by the selected computing system, and executing, by the selected computing system and in the container, the platform-dependent instructions to perform the at least one computational task.

In one example, a computer-readable storage medium comprising instructions that, when executed, cause a cloud computing platform comprising one or more computing systems to perform operations comprising: identifying a software package that is associated with a software application, wherein the software package includes platform-independent instructions that are configured to perform at least one computational task upon execution, and wherein the platform-independent instructions have a format that is not specific to any particular hardware platform provided by the one or more computing systems, and selecting, from the one or more computing systems, a computing system to perform the at least one computational task. The example operations further comprise providing, by the selected computing system, a container in which to perform the at least one computational task, obtaining, by the selected computing system, platform-dependent instructions that have been converted from the platform-independent instructions, wherein the platform-dependent instructions have a format that is specific to a hardware platform provided by the selected computing system; and executing, by the selected computing system and in the container, the platform-dependent instructions to perform the at least one computational task.

The details of one or more examples are set forth in the accompanying drawings and the description below. Other features, objects, and advantages of the disclosure will be apparent from the description and drawings, and from the claims.

DETAILED DESCRIPTION

Figure 1:
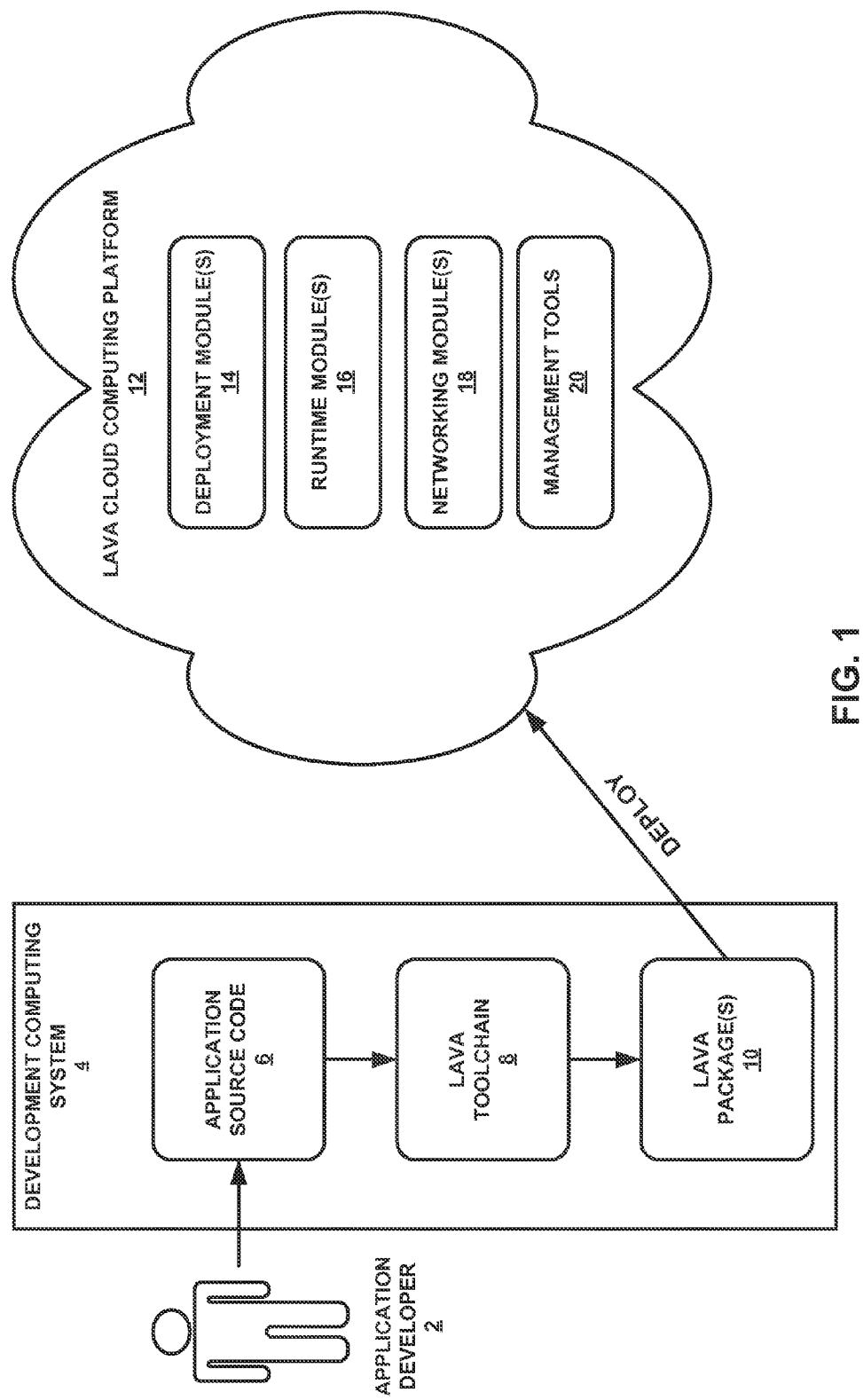
FIG. 1 is a block diagram illustrating an example development computing system and an example cloud platform, in accordance with one or more aspects of the present disclosure.

As described above, while cloud computing is an attractive platform architecture for many applications, such architectures are traditionally based on full or hardware-level virtualization techniques. Replicating the entirety of an operating system and emulating the hardware it runs on may introduce many inefficiencies. Full virtualization may also introduce management issues that come with long-term operating system maintenance. The traditional virtual machine abstraction is at too low a level for a generic compute cloud and, as a result, may require a full-blown operating system in each virtual machine instance. When looking at a cloud as a general computing resource on which a new application can be developed to securely run, this requirement limits the flexibility of the application architecture, and it also dramatically increases the cloud resources needed by the application in terms of memory and computational power.

Operating system level virtualization (OSLV) is a powerful tool for improving the security of software systems by isolating software components within a single operating system instance. In doing so, the use of OSLV eliminates the overhead of full virtualization per application. Isolating software components from one another and from the rest of the host system helps enforce the principle of least privilege by preventing compromised or malfunctioning components from accessing or modifying resources outside of their scope. OSLV can be viewed as an extension of an operating system's usual access controls. Operating systems by default limit a process' ability to access certain resources, including, for example, the private resources of other processes. OSLV is similarly enforced by the operating system, but provides a higher degree of isolation by creating virtualization "containers." Processes within a container can generally only access explicitly defined resources outside of their container. This approach has a lower overhead than hardware virtualization (e.g., virtualization using virtual machines), since it may not be necessary to virtualize the entire operating system and hardware.

One issue limiting the widespread application of OSLV to cloud software systems is that configuring and maintaining virtualization containers is a difficult, time consuming, and largely manual task, because configuring individual, properly secured containers for processes that need to communicate with one another is a difficult, time consuming task that may involve expert knowledge to perform correctly. When these processes are part of a large, distributed software system and communicate with one another across a multi-host cloud network, configuration may be even more challenging.

An OSLV-based cloud infrastructure would be able to handle this container setup automatically based on configuration parameters provided by the application developer. Because the developer may not necessarily need to be concerned with operating system configuration or platform-specific details, the developer can focus on the details of a particular application. Flexibility and runtime efficiency may be dramatically increased if the application can be made operating-system agnostic, such that it could be deployed on whatever cloud hardware is currently available.

One or more aspects of the present disclosure provide a cloud architecture, herein referred to as the Lightweight Application Virtualization Architecture, or LAVA, which allows new applications to be deployed utilizing fewer computing resources and less management burden, as well as providing a high level of security. Techniques are provided to securely isolate application components and allow them to be easily deployed within the cloud infrastructure. This secure isolation is lightweight and operating-system agnostic, and further allows flexible, secure communications amongst the deployed application components.

In various cases, LAVA provides an efficient platform for deploying cloud applications while preserving the application isolation features of traditional cloud systems and shrinking the attack surface. LAVA operates by combining OSLV technologies with portable, cross-platform instructions (e.g., bitcode), and with flexible, secure inter-process communication (IPC) within and across cloud systems. Developers who use LAVA are able to create packages of code that can run efficiently as processes on a wide range of hardware and operating systems. The LAVA infrastructure virtualizes these packages while transparently configuring strong isolation and protected communications between them using OSLV. OSLV, in turn, relies on native operating system mechanisms. As will be discussed in further detail below, a LAVA management web user interface may be able to configure system-wide resource limits, and may also be used to monitor and/or control the individual LAVA computing systems that are part of the overall platform. As a result, the use of LAVA will enable users to deploy scalable, cloud-based applications securely, efficiently, and with fine-grained management of resource consumption.

FIG. 1 is a block diagram illustrating an example development computing system 4 and an example cloud computing platform 12, in accordance with one or more aspects of the present disclosure. Cloud computing platform 12 may be referred to as the LAVA platform, which is an efficient and secure, compute-oriented cloud infrastructure that combines the scalability of cloud computing, the efficiency of OSLV, and the flexibility of portable executables.

An application developer 2 may utilize development computing system 4 as a toolchain. As shown in the example of FIG. 1, application developer 2 may utilize development computing system 4 to generate application source code 6. As will be described in further detail below, a LAVA toolchain 8 may generate one or more LAVA software packages 10 based on application source code 6. These software packages 10 may then be deployed (e.g., uploaded) on cloud computing platform 12. Toolchain 8 may comprise a collection of tools, libraries, and/or application programming interfaces (API's) that development computing system 4 may use to create packages 10, which comprise portable software components that are executed by cloud computing platform 12.

Cloud computing platform 12, in some examples, may comprise a managed collection of computing devices that execute infrastructure cloud-computing software. Users can run processing tasks distributed across cloud computing platform 12. Software applications that run on cloud computing platform 12 are composed of packages 10. Unlike traditional cloud-computing systems, where a user controls an entire virtualized operating system, packages 10 each comprise a module that is executable as single process running on a host system of cloud computing platform 12. Packages 10 are operating system independent, portable code modules, or instructions, which may run the same on any given system of cloud computing platform 12, regardless of the hardware and operating system that are implemented. In some examples, as will be described in further detail below, an individual package of packages 10 may be an object file containing Low Level Virtual Machine (LLVM) bitcode and/or other configuration data. LLVM provides an open-source compiler front-end that can output bitcode, which is a platform-independent intermediate software representation. LLVM tools of cloud computing platform 12 can then convert bitcode into optimized native code for any supported hardware platform of a given system of cloud computing platform 12.

As noted above, application developer 2 may utilize toolchain 8 of development computing system 4 to create packages 10 from application source code 6. These packages 10 may be associated with one or more software applications. Toolchain 8 may include a compiler front-end, such as an LLVM compiler front-end (e.g., LLVM-GCC or Clang), to generate platform-independent instructions (e.g., a bitcode object file). GCC-based compiler front-ends for LLVM are available for many programming languages, including C, C++, Java, Ruby, Python, PHP, Fortran, and others. Toolchain 8 may package this bitcode and any supporting resources, such as data files, into a package of packages 10.

The design approach of using LLVM bitcode as a deployed object file and compiling it to native code at runtime, on cloud computing platform 12, provides fast, hardware-independent computing capabilities. LLVM bitcode is both platform-agnostic and language-agnostic. Furthermore, cloud computing platform 12 can optimize LLVM bitcode at runtime to match the available hardware capabilities provided by cloud computing platform 12. This approach enables object files to be run and optimized on different hardware platforms supported by cloud computing platform 12.

Cloud computing platform 12 includes different modules that, together, enable a service provider to run a LAVA cloud. These modules, as shown in FIG. 1, include one or more deployment modules 14, one or more runtime modules 16, one or more networking modules 18, and management tools 20. In various examples, deployment modules 14 use OSLV technologies to provide secure, isolated processes, or containers, for each of packages 10 running in cloud computing platform 12. The specifications and properties of these containers are platform-independent. In some cases, the containers themselves may be implemented on supported platforms using certain technologies or operating systems, such as jails on FreeBSD and cgroups, LXC, and vServer on Linux, depending on the configuration of each computing system of cloud computing platform 12. The use of these containers enables individual processes to be strongly isolated from one another with low overhead.

Deployment modules 14 automatically create and configure these containers as necessary, which may include creating a new container and applying one or more security controls to the container (e.g., "locking it down") before allowing a package associated with the container to run. The container may be configured to limit the process' ability to access certain resources, including, for example, the private resources of other processes. Cloud computing platform 12 is capable of supporting a number of different operating systems, enabling cloud computing platform 12 to include a heterogeneous collection of hardware systems and/or virtual machines. The use of cloud computing platform 12 in such fashion may abstract away operating-system-specific details of how OSLV is implemented, providing end users with a single, OS-independent container for each of packages 10 regardless of the underlying technology. In some cases, rather than creating a new container, deployment modules 14 may select or reserve a container from a pool of reusable and/or pre-created containers.

The implementation of deployment modules 14 may additionally enable users and system administrators to restrict and measure system resource usage by packages 10. Resource restrictions enable users and system administrators to improve the security of a software application, based on execution of one or more of packages 10 associated with such application, by minimizing the system resources that can be accessed by the application. It also enables system administrators to limit the impact of individual packages and users on cloud computing platform 12. For example, system administrators may apply memory and/or central processing unit (CPU) limits to prevent runaway software from degrading system performance. System resource restriction and measurement enables computing systems of cloud computing platform 12 to implement equitable resource sharing.

Runtime modules 16 are software components that run packages 10 inside of containers, or processes (e.g., OSLV containers), and may also provide certain API functions. As one example, runtime modules 16 may unpack an individual package of packages 10, obtain (e.g., using backend modules such as LLVM back-end modules) platform-dependent instructions (e.g., machine code) that have been converted from a first group of platform-independent instructions (e.g., the LLVM intermediate bitcode objects), and executes the platform-dependent instructions, supplying them with native runtime environment libraries that correspond to the system-independent headers or API's that may be associated with the platform-independent instructions. In general, platform-independent instructions are instructions that are hardware, operating system, and/or programming language agnostic.

Networking modules 18 provide secured network connections between packages 10, enabling inter-process communication across potentially un-trusted networks. In some cases, packages 10 use simple TCP/IP connections to exchange data. A user can specify what type of security restrictions, such as encryption and authentication, to apply to data flows between packages 10. Networking configurations on the host computing systems of cloud computing platform 12 may explicitly control communication between packages, and network connections between different computing systems of cloud computing platform 12 (rather than between OSLV containers on the same system) may use tunnels to apply security to these network connections. The network tunnel architecture, however, is transparent to packages 10.

Management tools 20 monitor and control cloud computing platform 12, and also enable users to create and manage instances of packages 10. In various examples, management tools 20 provide a convenient management interface for users and system administrators. Using an interface provided by management tools 20, service providers can, for example, configure system-wide resource limits and monitor the health of computing systems that are included in cloud computing platform 12. Service providers can also obtain information about resource usage per user, enabling usage-based billing. Users can create and manage packages 10, apply resource limits, monitor resource usage, and configure networking and security controls using management tools 12.

In some examples, and as will be described in further detail below, in cloud computing platform 12, which comprises one or more computing systems, cloud computing platform 12 is able to identify a software package of packages 10 that is associated with a software application. The software package includes platform-independent instructions that are configured to perform at least one computational task upon execution, and the platform-independent instructions also have a platform-independent format (e.g., LLVM bitcode format) that is not specific to any particular hardware platform provided by the one or more computing systems. Cloud computing platform 12 selects (e.g., based on one or more resources of the hardware platform provided by a particular computing system), from the one or more computing systems, a particular computing system to perform the at least one computational task. The selected computing system provides (e.g., creates or selects) a container in which to perform the at least one computational task. The selected computing system may obtain platform-dependent instructions that have been converted from the platform-independent instructions, wherein the platform-dependent instructions have a platform-dependent format that is specific to a hardware platform provided by the selected computing system. The selected computing system then executes (e.g., in the container) the platform-dependent instructions to perform the at least one computational task. In general, as described throughout this application, the term "computing system" may refer to any type of computing system, such as, for example, a hardware or virtualized system.

Figure 2:
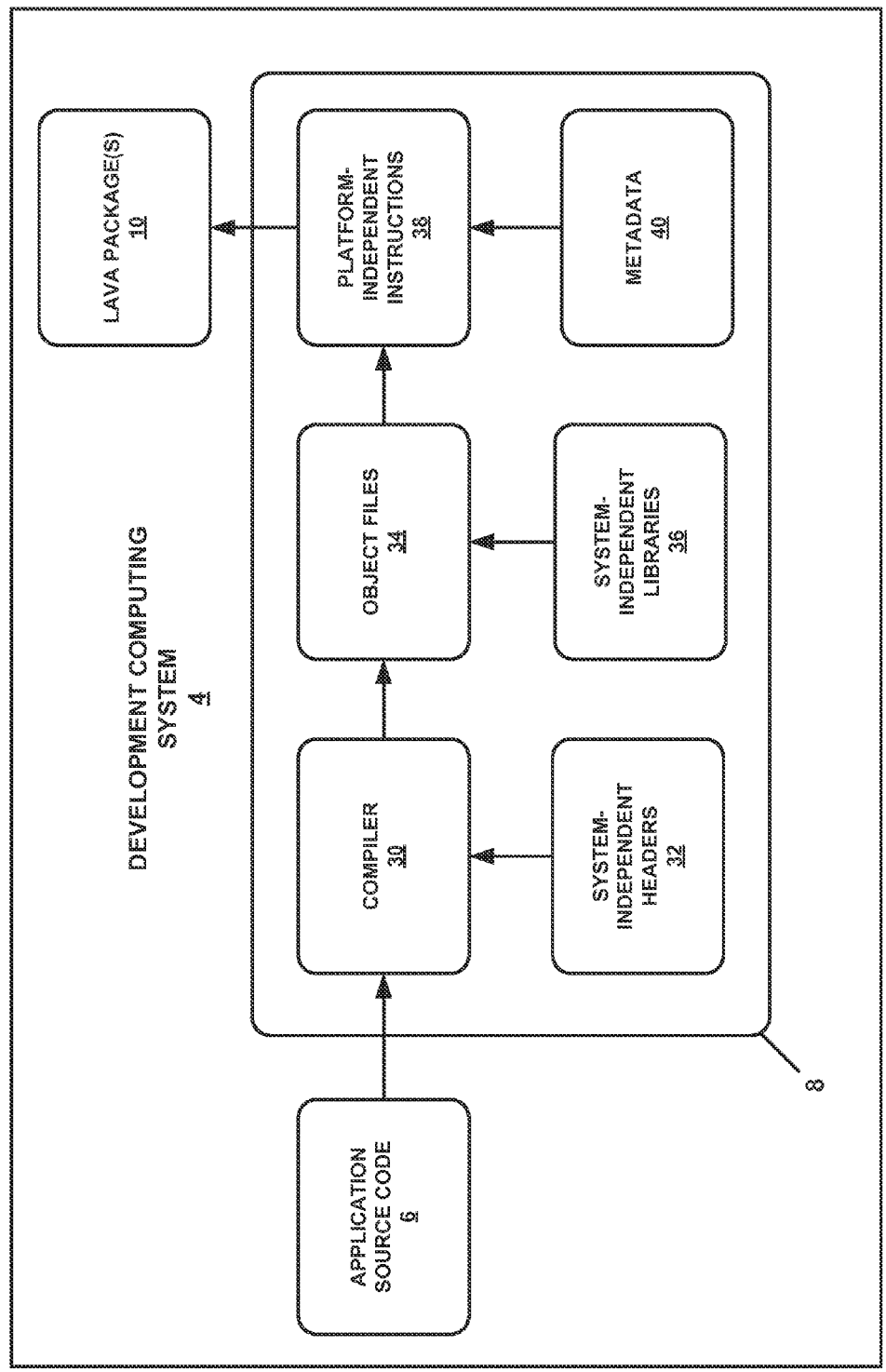
FIG. 2 is a block diagram illustrating one example of the development computing system shown in FIG. 1, in accordance with one or more aspects of the present disclosure.

FIG. 2 is a block diagram illustrating one example of development computing system 4 shown in FIG. 1, in accordance with one or more aspects of the present disclosure. As previously described in reference to FIG. 1, toolchain 8 is used to generate packages 10 based on application source code 6. These packages 10 may then be deployed (e.g., uploaded) on cloud computing platform 12. Additional example details of toolchain 8 are illustrated in FIG. 2.

As shown in the example of FIG. 2, toolchain 8 includes a compiler 30, system-independent headers 32, object files 34, system-independent libraries 36, metadata 40, and platform-independent instructions 38. Compiler 8 may comprise a compiler front end to generate object files 34 (e.g., bitcode object files). As one example, compiler 30 may comprise an LLVM compiler front end (e.g., LLVM-GCC or Clang). GCC-based compiler front-ends for LLVM are available for many programming languages, including C, C++, Java, Ruby, Python, PHP, Fortran, and others. In generating object files, compiler 30 may incorporate system-independent headers 32 that may correspond to system-independent API's. At run time, cloud computing platform 12 may supply native runtime environment libraries that correspond to system-independent headers 32.

Toolchain 8 generates platform-independent instructions 38 (e.g., LLVM bitcode) from object files 34 during a first-phase link. Platform-independent instructions 38 may have a format that is not specific to any particular hardware platform provided by the computing systems included in cloud computing platform 12. In some cases, toolchain 8 may link zero or more system-independent libraries 36 (e.g., LLVM bitcode libraries) with object files 34 to produce platform-independent instructions 38. System-independent headers 32 and system-independent libraries 36 are platform-independent components that are not specific to any particular computing system of cloud computing platform 12, or to any operating system executed by a particular computing system.

Toolchain 8 may package platform-independent instructions 38 and any supporting resources, such as metadata 40, into one or more packages 10. Metadata 40 may include user-supplied metadata associated with platform-independent instructions 38. In general, metadata 40 may include any data that can be utilized by platform-independent instructions 38. Once toolchain 8 has generated packages 10, these packages 10 can be distributed (e.g., uploaded) onto cloud computing platform 12 for execution.

Figure 3:
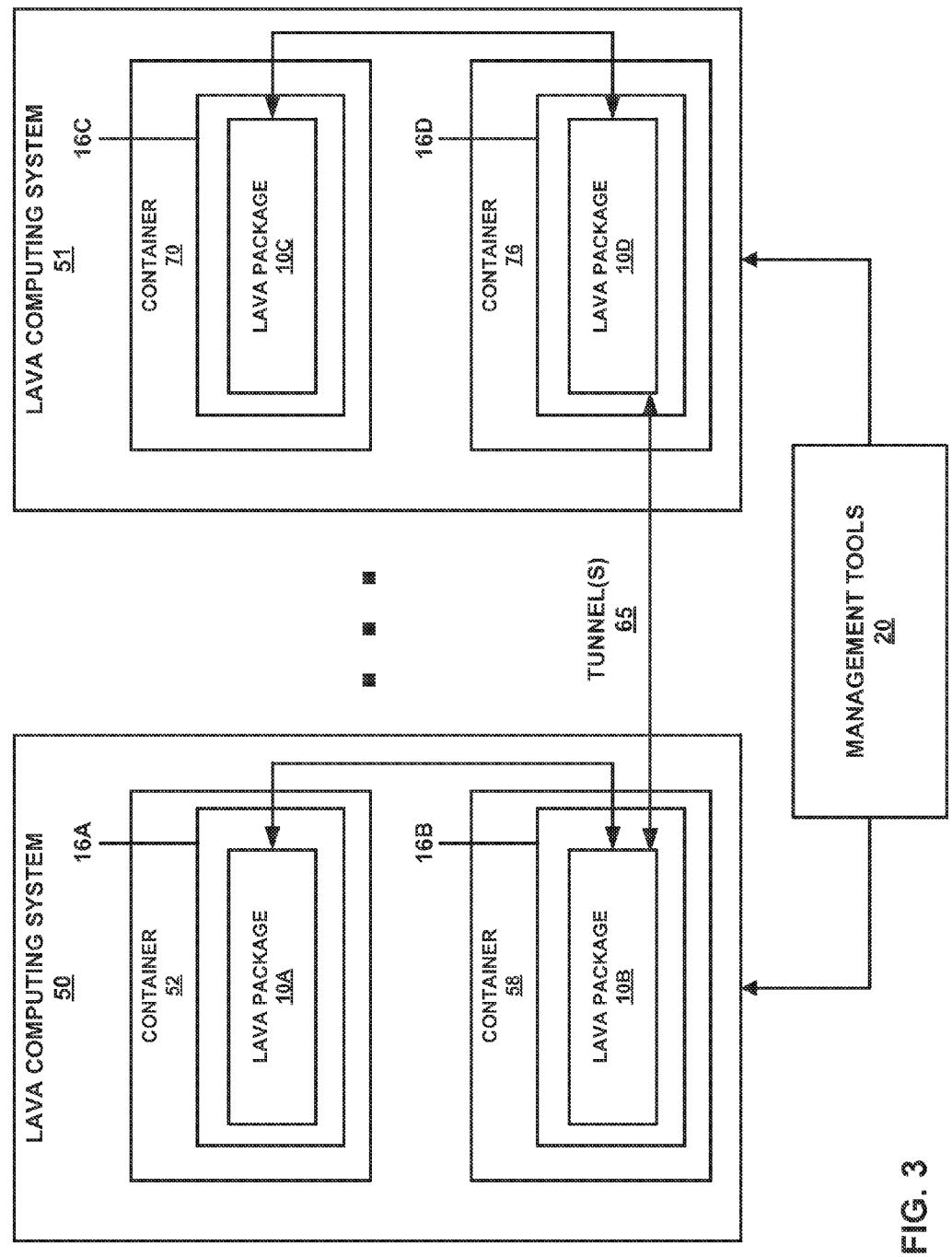
FIG. 3 is a block diagram illustrating an example of computing systems that may be included in the cloud computing platform shown in FIG. 1, in accordance with one or more aspects of the present disclosure.

FIG. 3 is a block diagram illustrating an example of computing systems 50 and 51 that may be included in the cloud computing platform 12 shown in FIG. 1, in accordance with one or more aspects of the present disclosure. Although only two computing systems 50 and 51 are shown in FIG. 3, any collection of one or more distinct computing systems may be included in cloud computing platform 12.

As described previously in reference to FIG. 1, cloud computing platform 12 includes one or more deployment modules 14, one or more runtime modules 16, one or more networking modules 18, and management tools 20. These modules may be implemented or otherwise executed by one or more of computing systems 50, 51, and/or by one or more other computing systems (not shown in FIG. 3) that are also included in cloud computing platform 12. In various examples, deployment modules 14 uses OSLV technologies to create secure, isolated processes, or containers, for each of packages 10 running in cloud computing platform 12. Deployment modules 14 may automatically create and configure these containers as necessary, which may include creating a new container and applying one or more security controls to the container (e.g., "locking it down") before allowing a package associated with the container to run. In some cases, rather than creating a new container, deployment modules 14 may select or reserve one or more containers from a pool of reusable and/or pre-created containers, such as containers that may have been previously used or created by deployment modules 14.

As shown in the example of FIG. 3, deployment modules 14 have provided containers 52 and 58 on example computing system 50, and have also provided containers 70 and 76 on example computing system 51. The specifications and properties of these containers 52, 58, 70, and 76 may be platform-independent. In some cases, the containers themselves may be implemented on supported platforms using certain technologies, such as jails on FreeBSD and cgroups, LXC, and/or vServer on Linux, depending on the operating system(s) supported by computing systems 50 and 51. In some examples, deployment modules 14 may be executed by one or more of computing systems 50, 51. In some examples, deployment modules 14 may be executed by one or more other computing devices that are part of cloud computing platform 12.

Runtime modules 16 run packages inside of containers, and may also provide certain API functions. As one example, runtime modules 16 may unpack an individual package, obtain platform-dependent instructions (e.g., machine code) that have been converted from a first group of platform-independent instructions (e.g., the LLVM intermediate bitcode), and execute the platform-dependent instructions, supplying them with native runtime environment libraries that correspond to system-independent headers or API's. FIG. 3 illustrates examples of runtime modules 16A, 16B, 16C, and 16D on computing systems 50 and 51. For example, computing system 50 includes runtime modules 16A and 16B, while computing system 51 includes runtime modules 16C and 16D. On computing system 50, runtime module 16A runs package 10A inside of container 52.

To do so, runtime module 16A may unpack package 10A, convert the platform-independent instructions included in package 10A into platform-dependent instructions that are specific to the hardware resources and/or operating system provided by computing system 50, and execute the platform-specific instructions. Similarly, runtime module 16B runs package 10B inside of container 58. On computing system 51, runtime module 16C runs package 10C inside of container 70, and runtime module 16D runs package 10D inside of container 76. Packages 10A-10D may be examples of packages 10 shown in FIGS. 1 and 2. Containers 52, 58, 70, and 76 may comprise OSLV containers. These containers may each comprise an operating system (OS)-independent container on one of computing system 50 or 51. In some examples, one or more of packages 10A-10D illustrated in FIG. 3 are associated with the same software application. In some cases, two or more of packages 10A-10D are different instances of the same package. In other cases, packages 10A-10D may each be associated with a different respective software application.

The implementation of deployment module 14 may enable restriction and/or measurement of system resource usage by each of packages 10A-10D. Resource restrictions, for example, may enable users and system administrators to improve the security of one or more software applications, based on execution of one or more of packages 10A-10D associated with such applications, by minimizing the system resources that can be accessed by these applications on computing system 50 and/or computing system 51. It also enables system administrators to limit the impact of individual processes and users on cloud computing platform 12. For example, system administrators may apply certain memory and/or CPU limits for one or more of computing systems 50, 51.

In some examples, networking modules 18 may be executed by one or more of computing systems 50, 51. Networking modules 18 provide secured network connections between packages 10A-10D, enabling inter-process communication within a given computing system and intra-process communication between computing systems. In some cases, the packages utilize TCP/IP connections to exchange data, and certain security restrictions, such as encryption and authentication, may be applied to data flows between packages, particularly if packages reside on different computing systems. As shown in FIG. 3, package 10A may communicate directly with package 10B within computing system 50, and package 10C may communicate directly with package 10D within computing system 51. However, package 10B on computing system 50 may also securely communicate with package 10D on computing system 51 via one or more tunnels 65. The network tunnel architecture, however, is transparent to packages 10B and 10D.

Management tools 20 monitor and control cloud computing platform 12, and also enable creation and management of packages 10A-10D. In various examples, management tools 20 provide a convenient management interface for users and system administrators. Using an interface provided by management tools 20, service providers can, for example, configure system-wide resource limits and monitor the health of computing systems 50, 51. Service providers can also obtain information about resource usage per user, enabling usage-based billing. Users can create and manage packages, apply resource limits, monitor resource usage, and configure networking and security controls using management tools 20. In some examples, management tools 20 may be executed by one or more of computing systems 50, 51. In some examples, management tools 20 may be executed by one or more other computing devices that are part of cloud computing platform 12.

Computing systems 50, 51 are capable of supporting a number of different operating systems, enabling cloud computing platform 12 to include a heterogeneous collection of hardware systems and/or virtual machines. The use of cloud computing platform 12 in such fashion may abstract away operating-system-specific details and provide a single, OS-independent container (e.g., container 52, 58, 70, 76) for each respective package (e.g., package 10A-10D), regardless of the underlying technology.

Figure 4A:
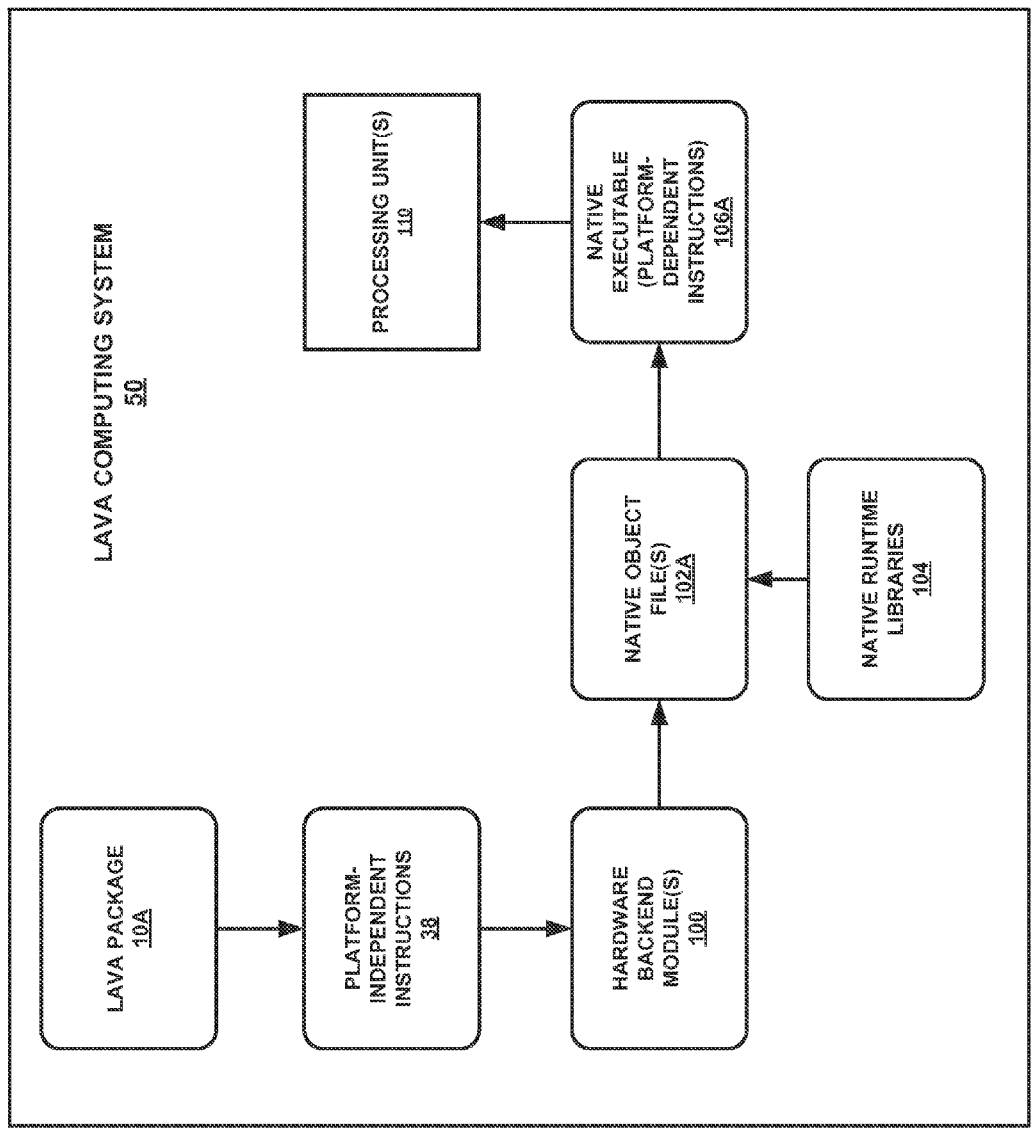
FIG. 4A is a block diagram illustrating a first example of further details of one of the example computing systems shown in FIG. 3, in accordance with one or more aspects of the present disclosure.

FIG. 4A is a block diagram illustrating further details of an example computing system 50 shown in FIG. 3, in accordance with one or more aspects of the present disclosure. The details illustrated in FIG. 4A are shown for purposes of illustration only, and may apply to one or more of computing systems included in cloud computing platform 12.

As one non-limiting example, package 10A is illustrated in FIG. 4A. As shown in FIG. 3, runtime module 16A may run package 10A inside of container 52, where container 52 may comprise, in certain cases, a process or thread. To do so, runtime module 16A may unpack package 10A and convert the platform-independent instructions included in package 10A into platform-dependent instructions that are specific to the hardware resources and/or operating system provided by computing system 50. As shown in the example of FIG. 4A, package 10A is unpacked to obtain platform-independent instructions 38.

Runtime module 16A may utilize one or more hardware backend modules 100 to convert (e.g., compile) platform-independent instructions 38 into one or more native object files 102A (e.g., native machine code) for computing system 50 and/or processing units 110. As described earlier in reference to FIG. 2, toolchain 8 previously generates platform-independent instructions from object files and zero or more system-independent libraries 36 during a first-phase link. During a second-phase link on computing system 50, runtime module 16A uses native object files 102A and native runtime libraries 104 to generate native executable 106A, which comprises platform-dependent instructions that are specific to processing units 110 of computing system 50. Runtime module 16A links in native runtime libraries 104 to match the system-independent headers (e.g., system-independent headers 32) originally compiled into platform-independent instructions 38 and/or to resolve references to native runtime libraries 104 at runtime. Upon generation of native executable 106A, one or more processing units 110 of computing system 50 may execute the platform-dependent instructions of native executable 106A. These platform-dependent instructions have a format that is specific to a hardware platform provided by computing system 50. For example, the platform-dependent instructions for native executable 106A may be specific to one or more of processing units 110, and may also be specific to the operating system(s) executed by processing units 110. Processing units 110 may, in some cases, comprise a heterogeneous collection of one or more different types of processing units.

In some examples, when platform-independent instructions 38 comprise LLVM bitcode, hardware backend modules 100 comprise one or more LLVM backend modules, and native object files 102A comprise native LLVM machine code. Additionally, native runtime libraries 104 may comprise LLVM libraries that are linked in with the LLVM machine code to generate native executable 106A.

In some cases, processing units 110 may include one or more specialized processing units (e.g., graphics processing units and/or field-programmable gate arrays). In these cases, the format of platform-independent instructions 38 is not specific to the one or more specialized processing units, while the format of platform-dependent instructions of executable 106A is specific to the one or more specialized processing units. In various examples, the computing systems included in cloud computing platform 12 may comprise a heterogeneous group of computing systems that includes at least two different types of processing units (e.g., graphics processing units and field-programmable gate arrays) amongst the different computing systems.

FIG. 4A illustrates an example of the processing of package 10A by runtime module 16A to generate native object files 102A and native executable 106A (including platform-dependent instructions) from platform-independent instructions 38. However, any number of runtime modules 16 may be used to generate native executables from corresponding packages 10. For example, although not specifically shown in FIG. 4A, runtime module 16B may generate native object files 102B and native executable 106B from platform-independent instructions 38B that are unpacked from package 10B. Similarly, computing system 51 may generate native executables from packages 10C and 10D using runtime modules 16C and 16D, respectively. Computing system 51 may have the same number of, more, or fewer processing units than computing system 50, and these processing units may comprise a heterogeneous collection of different types of processing units. In addition, computing systems 50 and 51 may, in some examples, implement different operating systems.

The conversion of platform-independent instructions 38 into platform-dependent instructions 106A can, in some cases, take place in advance (e.g., long before processing the request to perform the task) or on demand (e.g., immediately or shortly before performing the task). Furthermore, platform-dependent instructions 106A can be cached by computing system 50 for later use. In addition, in some cases, the conversion operations may be performed by any computing system in cloud computing platform 12, not just a selected computing system (e.g., computing system 50). As one non-limiting example, if cloud computing platform 12 includes N different kinds of computing systems and/or processing unit architectures, the computing systems of cloud computing platform 12 may automatically generate and then store the N different sets of platform-dependent instructions (e.g., platform-dependent instructions 106A-106N) from platform-independent instructions 38 for a given software package (e.g., package 10A), so that when a user requests execution of the package, cloud computing platform 12 may select the correct ones of the pre-generated platform-dependent instructions based on the corresponding computing system and/or processing unit(s) that are determined for execution of these instructions.

Figure 4B:
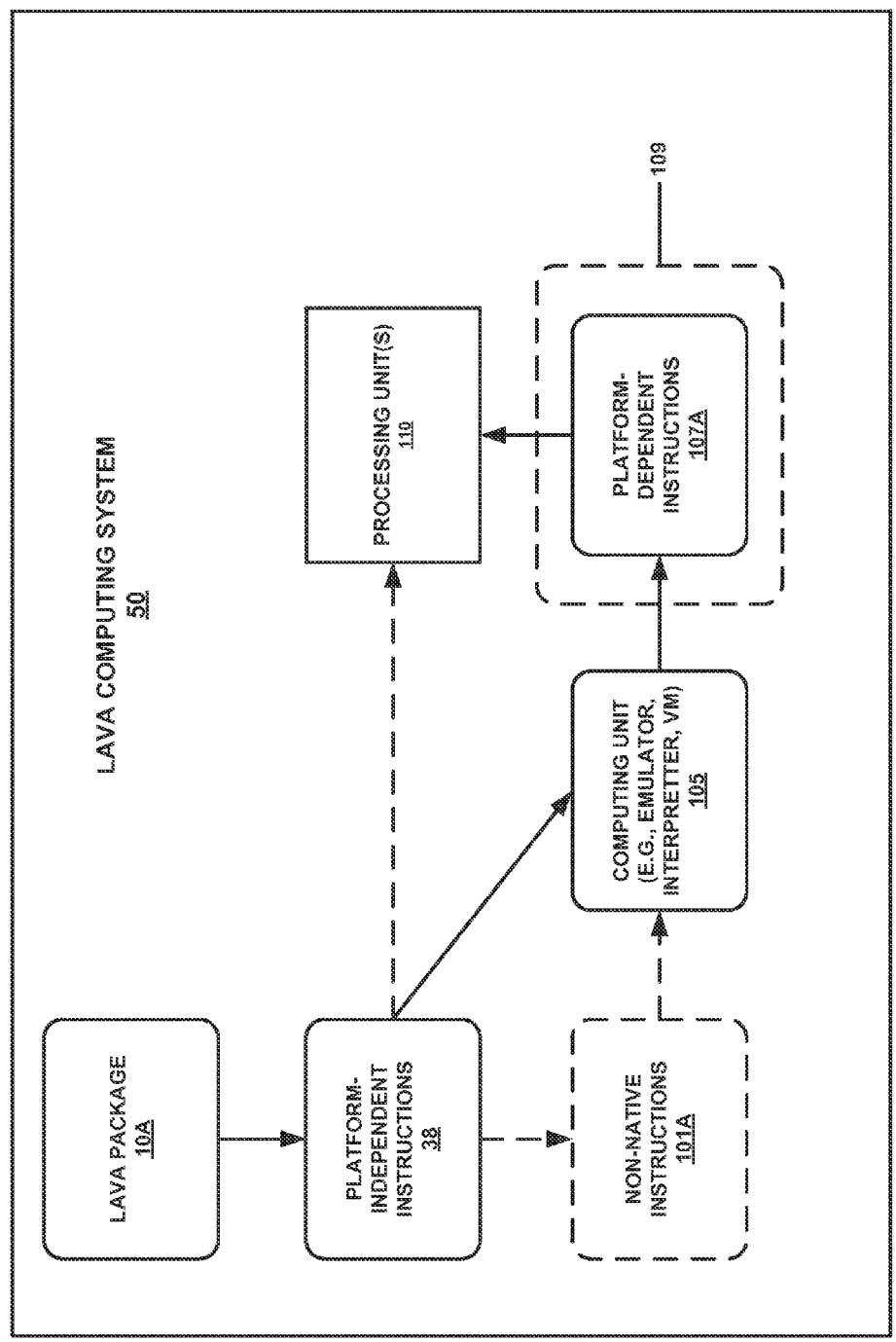
FIG. 4B is a block diagram illustrating a second example of further details of one of the example computing system shown in FIG. 3, in accordance with one or more aspects of the present disclosure.

FIG. 4B is a block diagram illustrating a second example of further details of one of the example computing system 50 shown in FIG. 3, in accordance with one or more aspects of the present disclosure. The example of FIG. 4B also illustrates computing system 50 with package 10A, platform-independent instructions 38, and processing units 110. However, the example of FIG. 4B also illustrates computing system 50 with computing unit 105, platform-dependent instructions 107A, as well as optionally non-native instructions 101A and support application 109.

As an alternative to the example implementation shown in FIG. 4A, FIG. 4B shows an example of computing system 50 in which platform-independent instructions 38 can be run in computing unit 105 (e.g., an emulator, interpreter, or virtual machine). One example of computing unit 105 may be an LLVM interpreter. Computing unit 105 may perform just-in-time compilation to convert platform-independent instructions 38 into native, platform-dependent instructions 107A.

Alternately, platform-independent instructions 38 could be translated into a sequence of non-native instructions 101A that can then be run in computing unit 105. For example, platform-independent instructions 38 could be translated into non-native instructions 101A comprising Java bytecode, and computing unit 105 comprising a Java Virtual Machine could then execute the Java bytecode and use just-in-time compilation to generate platform-dependent instructions 107A.

In some examples, rather than producing an independent native executable (e.g., executable 106A shown in FIG. 4A), computing system 50 of FIG. 4B may produce a native code module comprising platform-dependent instructions 107A, which, in some instances, may be loaded and executed by a support application 109. In these instances, some of the support libraries that would have been linked into executable 106A shown in FIG. 4A (e.g., native runtime libraries 104) may instead reside as part of support application 109 (e.g. a "sandbox" process). In certain cases, platform-independent instructions 38 or non-native instructions 101A, such as Java bytecode, may actually be directly executable on certain types of processing units 110.

As a result, according to various examples, the LAVA architecture described with reference to FIGS. 1-4A/4B provides an efficient platform for deploying cloud applications while preserving the application isolation features of traditional cloud systems and shrinking the attack surface. In these examples, the LAVA architecture operates by combining OSLV technologies with portable, cross-platform packages and flexible, secure inter-process communication between packages, both within and across cloud computing systems. Process-level virtualization and inter-process communications that are customized to each computing system in cloud computing platform 12 (and respective host operating system for each system) may enable strong security with reduced attack surface compared with conventional virtual machine-based clouds. Each of these computing systems is configured to run optimized native code for high performance, and also to provide runtime flexibility while performing just-in-time compilation from architecture-independent packages, as illustrated in FIG. 4A. Using the techniques described herein, a developer (e.g., application developer 2) can create or adapt existing secure cloud-based applications that may be automatically tailored for efficient operation within cloud computing platform 12, letting the developer be more productive by focusing on domain-specific issues rather than on details of operating system configuration, management, and updates. Further, the techniques described herein may help increase the long-term efficiency of deploying applications, potentially lessening both hardware and management costs.

Figure 5:
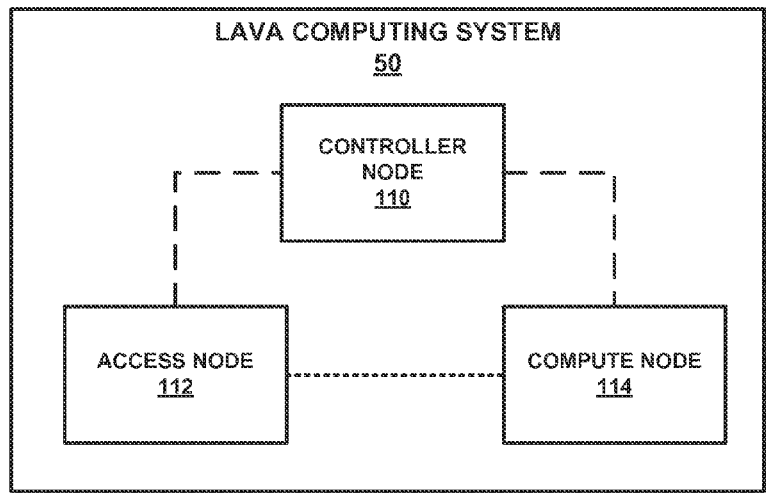
FIGS. 5-7 are block diagrams illustrating example configurations of one or more of the computing systems shown in FIGS. 3 and 4, in accordance with one or more aspects of the present disclosure.
Figure 6:
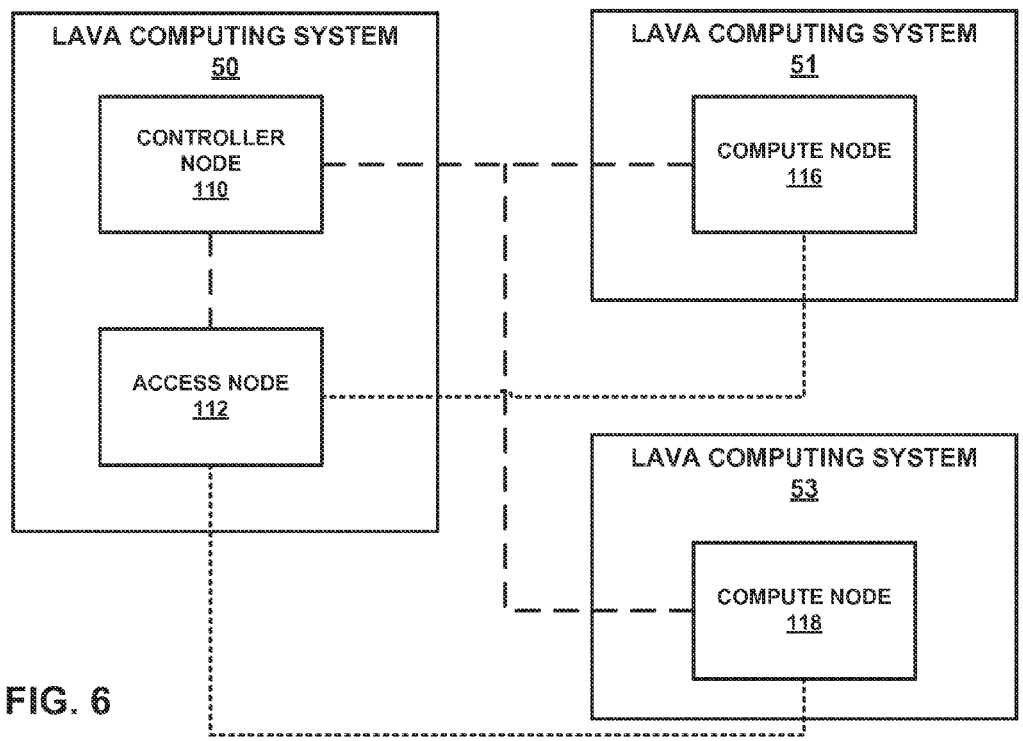
Figure 7:
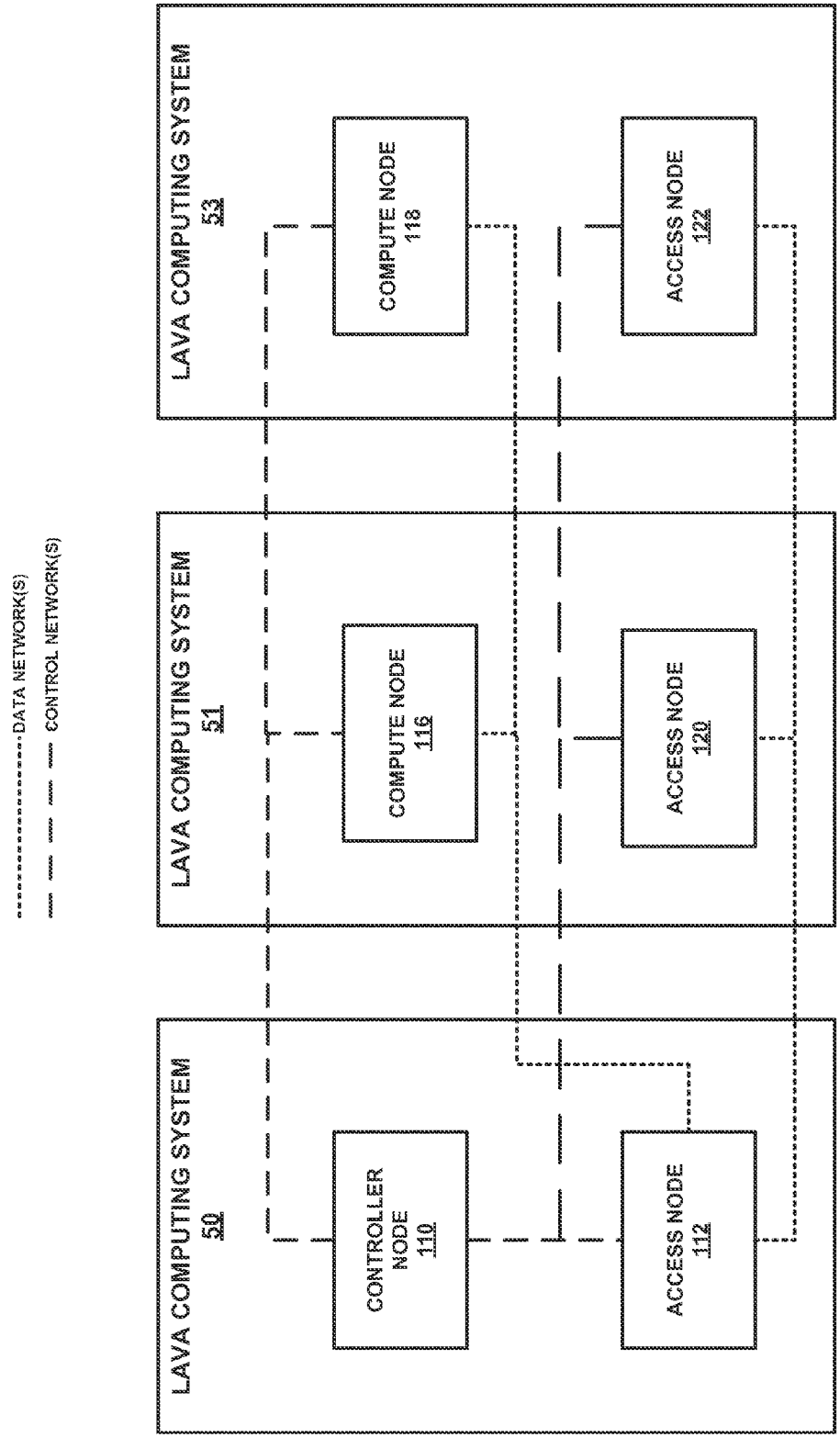

FIGS. 5-7 are block diagrams illustrating example configurations of one or more of the computing systems shown in FIGS. 3 and 4, in accordance with one or more aspects of the present disclosure. In general, cloud computing platform 12 may comprise one or more computing systems, such as computing systems 50 and 51 described previously. In various examples, cloud computing platform 12 may include a controller node, one or more access nodes, and one or more compute nodes, where the term "node" refers to a particular configuration and/or software stack but does not necessarily imply a dedicated computer.

Thus, in one example, such as that illustrated in FIG. 5, a single computing system, such as computing system 50, can host any or all of the controller, access, and compute functions. In this example, computing system 50 includes a controller node 110, an access node 112, and a compute node 114. Controller node 110 communicates with each of access node 112 and compute node 114 via one or more control networks, and access node 112 communicates with compute node 114 via one or more data networks, as indicated in the figure.

In various examples, controller node 110 may be responsible for tracking cloud resources, monitoring resource usage, allocating resources to particular tasks, and determining how to implement a particular user request given the available resources in cloud computing platform 12. For example, if a user requests a collection of twenty containers on a single private network, all running a respective package associated with an application "foo," controller node 110 might do one or more of the following: (1) determine which compute nodes (e.g., compute node 114 in FIG. 5; compute notes 116, 118 in FIG. 6; compute nodes 116, 122 in FIG. 7) in cloud computing platform 12 to use and how many containers to put on each compute node; (2) reserve the appropriate number of containers on each compute node; (3) instruct participating compute nodes to construct the network interfaces, bridges, tunnels, or the like to implement the private network; (4) wait for all participating compute nodes to finish implementing the network; (5) ensure that each participating compute node has a copy of the foo executable and any associated packages; (6) instruct the compute nodes to instantiate the containers and launch foo; and/or (7) report that the request was fulfilled. Controller node 110 may also be logically responsible for administrative functions and other centralized cloud services, such as user authentication and storage management. In one or more examples, controller node 110 may implement one or more features of deployment modules 14, runtime modules 16, networking modules 18, and/or management tools 20 shown in FIG. 1.

A compute node (such as compute node 114 shown in FIG. 5, compute nodes 116, 118 shown in FIG. 6, or compute nodes 116, 122 shown in FIG. 7), may run a computing service that is responsible for actually executing LAVA packages and managing the host resources used by LAVA. This may include creating and/or managing network components (e.g., virtual interfaces, bridges, tunnels), creating and managing containers, caching packages, managing data storage (e.g., local, shared, ephemeral), monitoring system-wide and per-container resource consumption and/or load, and/or implementing resource limits on containers. The compute service operates by communicating with controller node. In one or more examples, a compute node may implement one or more features of deployment modules 14, runtime modules 16, networking modules 18, and/or management tools 20 shown in FIG. 1.

An access node (such as access node 112 shown in FIG. 5, access node 112 shown in FIG. 6, or access nodes 112, 120, 122 shown in FIG. 7) is any node that is part of cloud computing platform 12 that runs a network-access service. The network-access service is responsible for providing external-network connectivity for LAVA applications and users. This service may have two related components. First, the network-access service provides external-network connectivity to applications that request it (e.g., connecting to the Internet). The network-access service may also be responsible for creating, managing, and/or monitoring the virtual network components used to implement external access. Second, the network-access service provides an API endpoint to LAVA users. That is, a user can connect to any access node and issue requests. These requests can then be forwarded to controller node 110. An access node may, in various examples, provide access to one or more of deployment modules 14, runtime modules 16, networking modules 18, and/or management tools 20.

As noted above, in FIG. 5, computing system 50 includes controller node 110, access node 112, and compute node 114. However, various other configurations of computing systems in cloud computing platform may also be utilized, such as those shown in FIGS. 6 and 7. In FIG. 6, computing system 50 includes controller node 110 and an access node 112. Computing system 51 includes a compute node 116, and another computing system 53 of cloud computing platform 12 includes a compute node 118. Controller node 110 communicates with access node 112, compute node 116 and compute node 118 via one or more control networks. Access node 112 communicates with compute node 116 and compute node 118 via one or more data networks. In FIG. 6, a single node, namely access node 112, may comprise the access point to cloud computing platform 12. When a user issues a request via access node 112, that request is sent to controller node 110. Controller node 110 is able to communicate with one or more of compute nodes 116, 118 via the one or more control networks to satisfy the user request. If the launched application performs any input/output operations with the user or connects to an external network, the container for the package associated with the application is appropriately configured to communicate with access node 112 over the one or more internal data networks.

FIG. 7 illustrates another example configuration of computing systems in cloud computing platform 12 that includes distributed access points. In FIG. 7, computing system 50 includes controller node 110 and an access node 112. Computing system 51 includes compute node 116 and also an access node 120. Computing system 53 includes compute node 118 and an access node 122. Controller node 110 communicates with access node 112, access node 120, access node 122, compute node 116 and compute node 118 via one or more control networks. Access node 112 communicates with compute node 116 and compute node 118 via one or more data networks. In addition, access nodes 112, 120, and 122 are communicatively coupled via the one or more data networks.

In the example of FIG. 7, in addition to access nodes 112, 120, and 122, every compute node 116 and 118, as well as controller node 110, may serve as access point to cloud computing platform 12. In this case, a user might issue a request to controller node 110. Controller node 110 may suggest a redirect to the compute node on which the container will be run (e.g., compute node 116 or 118). User input/output and external network access can then use that compute node, which may provide lower latency, higher bandwidth, and less load on any one access node 112, 120, and/or 122.

Figure 8:
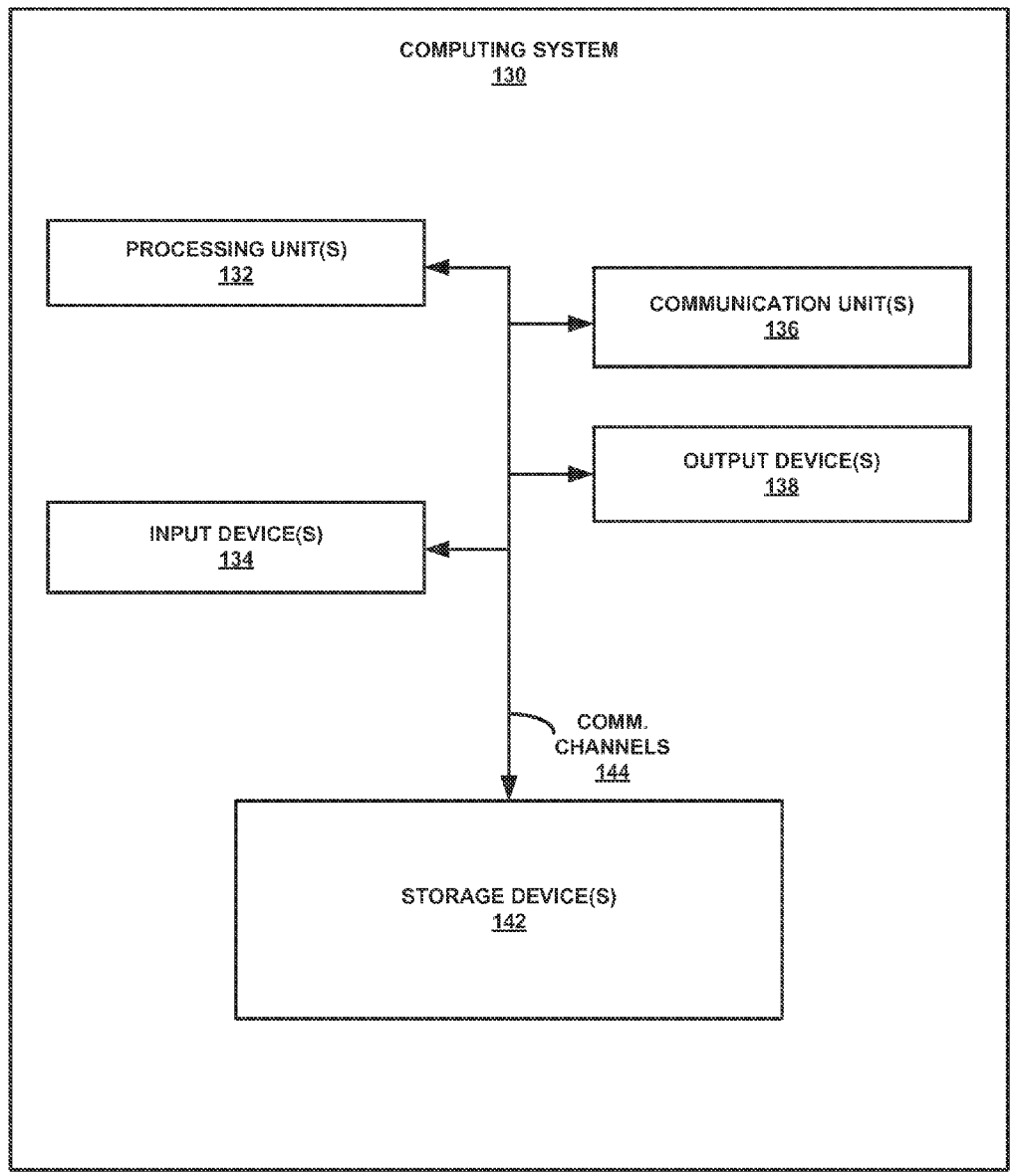
FIG. 8 is a block diagram illustrating further details of an example computing system, such as one or more of the computing systems shown in FIGS. 1-7, in accordance with one or more aspects of the present disclosure.

FIG. 8 is a block diagram illustrating further details of an example computing system 130, such as one or more of the computing systems shown in FIGS. 1-7, in accordance with one or more aspects of the present disclosure. FIG. 8 illustrates only one particular example of computing system 130, and many other examples of computing system 130 may be used in other instances and may include a subset of the components shown, or may include additional components not shown, in FIG. 8.

As shown in the example of FIG. 8, computing system 130 includes one or more processing units 132, one or more input devices 134, one or more communication units 136, one or more output devices 138, and one or more storage devices 142. Communication channels 144 may interconnect each of the components 132, 134, 136, 138, and 142 for inter-component communications (physically, communicatively, and/or operatively). In some examples, communication channels 144 may include a system bus, a network connection, an inter-process communication data structure, or any other method for communicating data between hardware and/or software.

One or more input devices 134 of computing system 130 may receive input. Examples of input are tactile, audio, and video input. Examples of input devices 134 include a presence-sensitive screen, touch-sensitive screen, mouse, keyboard, voice responsive system, video camera, microphone or any other type of device for detecting input from a human or machine.

One or more output devices 138 of computing system 130 may generate output. Examples of output are tactile, audio, and video output. Examples of output devices 138 include a presence-sensitive screen, sound card, video graphics adapter card, speaker, cathode ray tube (CRT) monitor, liquid crystal display (LCD), or any other type of device for generating output to a human or machine. Output devices 138 may include display devices such as cathode ray tube (CRT) monitor, liquid crystal display (LCD), or any other type of device for generating tactile, audio, and/or visual output.

One or more communication units 136 of computing system 130 may communicate with one or more other computing systems or devices via one or more networks by transmitting and/or receiving network signals on the one or more networks. Examples of communication unit 136 include a network interface card (e.g. such as an Ethernet card), an optical transceiver, a radio frequency transceiver, or any other type of device that can send and/or receive information, such as through a wired or wireless network. Other examples of communication units 136 may include short wave radios, cellular data radios, wireless Ethernet network radios, as well as universal serial bus (USB) controllers. Communication units 136 may provide wired and/or wireless communication.

One or more storage devices 142 within computing system 130 may store information for processing during operation of computing system 130 (e.g., computing system 130 may store data accessed by one or more modules, processes, applications, or the like during execution at computing system 130). In some examples, storage devices 142 on computing system 130 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 142, in some examples, also include one or more computer-readable storage media. Storage devices 142 may be configured to store larger amounts of information than volatile memory. Storage devices 142 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 142 may store program instructions and/or data associated with one or more software/firmware elements or modules.

For example, when computing system 130 comprises an example of development computing system 4 shown in FIG. 1, storage devices 142 may store application source code 6 and packages 10. In addition, storage devices 142 may store instructions and/or data associated with system-independent headers 32, object files 34, system-independent libraries 36, metadata 40, platform-independent instructions 38, and compiler 30, shown in FIG. 2.

In other examples, when computing system 130 comprises an example of a computing system included in cloud computing platform 12 (e.g., computing system 50, 51, 53), storage devices 142 may store instructions and/or data associated with deployment modules 14, runtime modules 16, networking modules 18, and management modules 20 shown in FIG. 1. Storage devices 142 may also store instructions and/or data associated with package 10A, platform-independent instructions 38, native object files 102A, native runtime libraries 104, native executable (platform-dependent instructions) 106A, and hardware backend modules 100 shown in FIG. 4A.

Storage devices 142 also stores instructions and/or data associated with an operating system, which may be used by computing system 130 during operation. As described herein, cloud computing platform 12 may include any number of different computing systems, and these computing systems may utilize one or more different operating systems (e.g., FreeBSD, Linux).

Computing system 130 further includes one or more processing units 132 that may implement functionality and/or execute instructions within computing system 130. For example, processing units 132 may receive and execute instructions stored by storage devices 142 that execute the functionality of the elements and/or modules described herein. These instructions executed by processing units 132 may cause computing system 130 to store information within storage devices 142 during program execution. Processing units 132 may also execute instructions of the operating system to perform one or more operations described herein. In those examples in which computing system 130 comprises a computing system of cloud computing platform 12, processing units 132 may comprise an example of processing units 110 shown in FIG. 4A.

Figure 9:
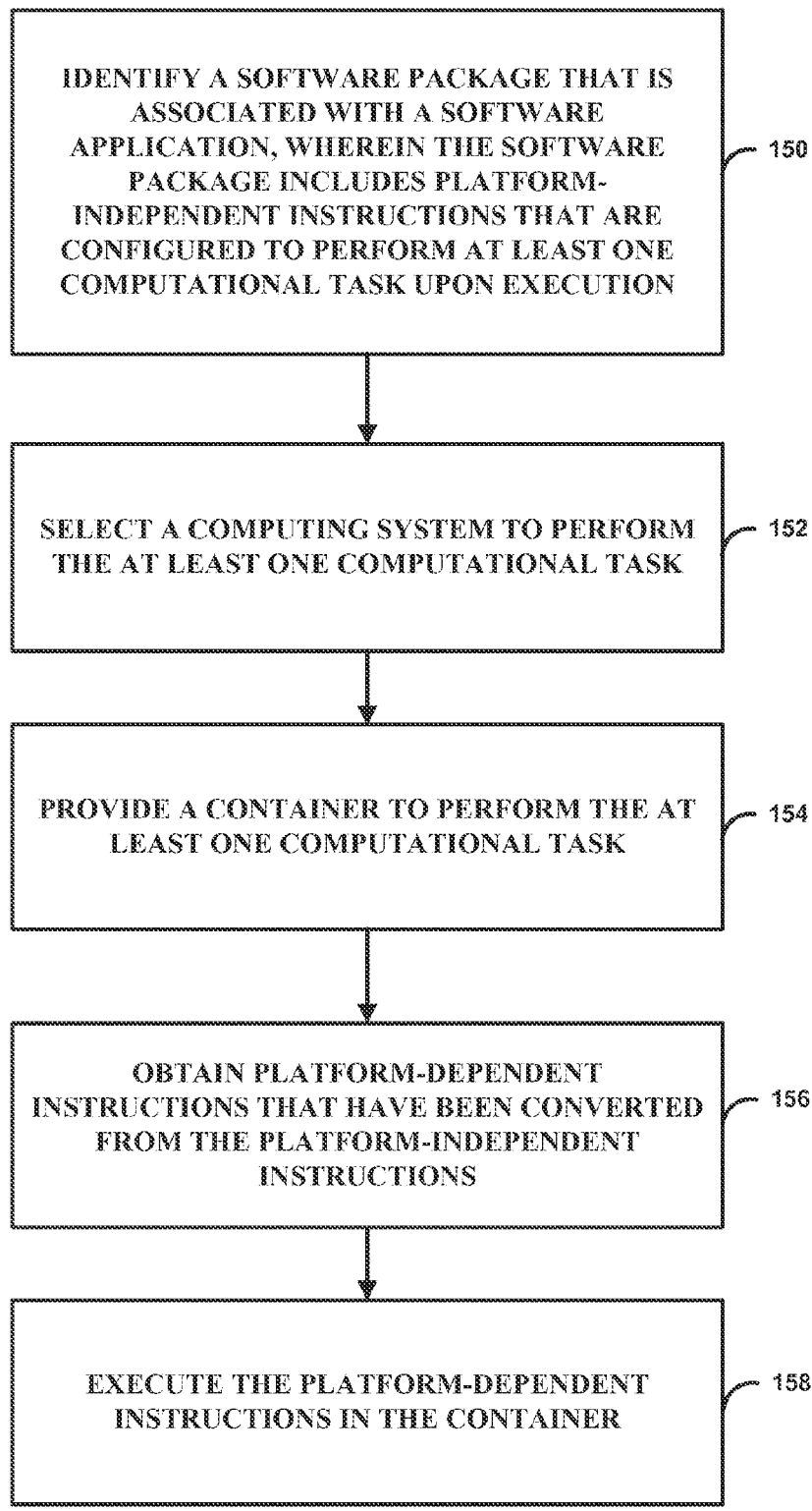
FIG. 9 is a flow diagram illustrating an example process that may be performed by a computing system, in accordance with one or more aspects of the present disclosure.

FIG. 9 is a flow diagram illustrating an example process that may be performed by a computing system, in accordance with one or more aspects of the present disclosure. For example, the process illustrated in FIG. 9, which may comprise one or more operations, may be performed by a computing system included in cloud computing platform 12.

As illustrated in FIG. 9, in a cloud computing platform (e.g., cloud computing platform 12) comprising one or more computing systems, the process may include identifying a software package (e.g., package 10A shown in FIGS. 4A/4B) that is associated with a software application (150). The software package includes platform-independent instructions (e.g., platform-independent instructions 38) that are configured to perform at least one computational task upon execution, where the platform-independent instructions have a format that is not specific to any particular hardware platform provided by the one or more computing systems.

The process illustrated in FIG. 9 further includes selecting, from the one or more computing systems, a computing system (e.g., computing system 50, 51, 53) to perform the at least one computational task (152), and providing, by the selected computing system, a container (e.g., container 52, 58, 70, or 76) in which to perform the at least one computational task (154). The process further includes obtaining, by the selected computing system, platform-dependent instructions (e.g., platform-dependent instructions 106A shown in FIGS. 4A/4B) that have been converted from the platform-independent instructions (156). The platform-dependent instructions have a format that is specific to a hardware platform provided by the selected computing system (e.g., computing system 50 and processing units 110 included in computing system 50). The process may further include executing, by the selected computing system (e.g., by processing units 110), and in the container, the platform-dependent instructions to perform the at least one computational task (158). Obtaining the platform-dependent instructions may include compiling, by the selected computing system, the platform-independent instructions to generate the platform-dependent instructions.

In some cases, selecting the computing system to perform the at least one computational task comprises selecting the computing system (e.g., by deployment modules 14) based on one or more resources of the hardware platform provided by the computing system. For example, the selecting may be based on which processing units or types of processing units are provided on a given computing system, the operating system(s) that are used on the given system, the current available memory and/or processing bandwidth utilized or available on the given system, current network load, and/or other resources associated with the system.

As previously described, in some cases, the selected computing system includes one or more specialized processing units. For example, processing units 110 illustrated in FIGS. 4A/4B may comprise one or more specialized processing units (e.g., graphics processing units and/or field-programmable gate arrays). The format of the platform-independent instructions is not specific to the one or more specialized processing units, while the format of platform-dependent instructions is specific to the one or more specialized processing units. In these cases, executing the platform-dependent instructions to perform the at least one computational task includes executing, by the one or more specialized processing units, the platform-dependent instructions. The platform-independent instructions may comprise Low Level Virtual Machine (LLVM) bitcode, and converting the platform-independent instructions into the platform-dependent instructions may comprise compiling (e.g., by hardware backend modules 100 shown in FIG. 4) the LLVM bitcode into the platform-dependent instructions that are executable by the selected computing system.

In some examples, the container comprises an operating system level virtualization (OSLV) container, and providing the container in which to perform the at least one computational task comprises one of the following: creating the container; or selecting the container from a group of pre-created containers provided by the selected computing system. In some cases, the process of FIG. 9 further includes configuring the container prior to executing the platform-dependent of instructions. Configuring the container may include applying one or more security controls to the container, where the security controls are configured to restrict access of the container to only a group of resources of the platform (e.g., hardware platform) provided by the selected computing system.

In some examples, the software package comprises a first software package that is associated with a first software application, the at least one computational task comprises at least one first computational task, the selected computing system comprises a first selected computing system, the platform-independent instructions comprise a first group of platform-independent instructions, the platform-dependent instructions comprise a first group of platform-dependent instructions, and the container comprises a first container. The example process of FIG. 9 may further include identifying a second software package that is associated with a second software application, the second software package including a second group of platform-independent instructions that are configured to perform at least one second computational task upon execution, where the second group of platform-independent instructions have a format that is not specific to any particular hardware platform provided by the one or more computing systems.

In these examples, the example process further includes selecting, from the one or more computing systems, a second computing system to perform the at least one second computational task, and providing, by the second selected computing system, a second container in which to perform the at least one second computational task, obtaining, by the second selected computing system, a second group of platform-dependent instructions that have been converted from the second group of platform-independent instructions, wherein the second group of platform-dependent instructions have a format that is specific to a hardware platform provided by the second selected computing system, and executing, by the second selected computing system and in the second container, the second group of platform-dependent instructions to perform the at least one second computational task.

In certain cases, the first software application and the second software application comprise the same software application. In certain cases, the first selected computing system and the second selected computing system comprise the same computing system. Executing the first group of platform-dependent instructions in the first container and executing the second group of platform-dependent instructions in the second container can occur during execution of a single instance of an operating system (e.g., single instance of an operating system running on computing system 50). The example process may further include providing a secure communication mechanism between the first container and the second container, where providing the secure communication mechanism includes applying one or more security restrictions to at least one data flow between the first container and the second container.

In other cases, the first selected computing system (e.g., computing system 50) is different from the second selected computing system (e.g., computing system 51). In these cases, providing the secure communication mechanism includes providing one or more tunnels (e.g., tunnels 65 shown in FIG. 3) between the first container and the second container.

In various examples, the techniques of the present disclosure may provide higher performance and lower overhead in the implementation of cloud computing platform 12, while maintaining the security and isolation of full or hardware virtualization. LAVA's portable executable packages enable a developer to create compile-one, run-anywhere software that runs automatically on heterogeneous computing systems included in cloud computing platform 12, regardless of the hardware and operating systems provided on such computing systems. In such fashion, the techniques of the present disclosure may enable computational applications to more efficiently use computing hardware while gaining the benefits of cloud computing in cloud computing platform 12, including scalability and elasticity.

For example, the techniques of the present disclosure may provide scalability, resource sharing, and isolation of processes or applications in cloud computing platform 12, without necessarily utilizing separate operating system instances on any given computing system included in cloud computing platform 12. Cloud computing platform 12 enables users to run platform-independent packages inside isolated OSLV containers (e.g., package 10A of FIG. 3 inside container 52, package 10B inside container 58, package 10C inside container 70, package 10D inside container 76).

In various cases, the present techniques apply strong, operating system independent process isolation by using OSLV technologies to provide these configurable, secure containers whose properties are independent of the underling operating system and OSLV technology. In many cases, cloud computing platform uses LLVM bitcode and a platform-independent runtime API so that developers (e.g., application developer 2) can create and deploy platform-independent packages. However, cloud computing platform 12 is able to take advantage of specialized hardware or software capabilities of individual cloud computing systems (e.g., computing systems 501, 51, and/or 53) for improved efficiency. These computing systems are capable of compiling platform-independent instructions into platform-dependent instructions at run time, which allows the same package to be optimized for a wide variety of different platforms, including those that use, e.g., graphics processing units.

As described previously, cloud computing platform 12 is capable of controlling and/or measuring resource usage per computing system included in cloud computing platform 12, such as by using underlying capabilities (e.g., OSLV capabilities) to enable users and system administrators to control and/or measure resource usage by packages. Cloud computing platform 12 may, in some cases, achieve such control and/or measurement through the selection of which computing systems execute which packages at deployment (e.g., by deployment modules 14). Cloud computing platform 12 may also restrict resource access by one or more packages according to deployment policies, as described previously. In such fashion, cloud computing platform 12 gives users detailed, operating system independent control over the system resources that can be used by packages.

In addition, cloud computing platform 12 may provide flexible, secure communication between packages. For example, networking modules 18 may provide secure communication channels between package instances, whether or not the packages are contained in the same computer system of cloud computing platform 12 or are contained in different systems. Network security controls are configurable by the user and transparent to running packages.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   in a cloud computing platform comprising one or more computing systems, identifying, in a runtime environment, a software package that is associated with a software application, wherein the software package includes platform-independent instructions that are configured to perform at least one computational task and that are compiled from application source code associated with the software application, and wherein the platform-independent instructions have a format that is not specific to any particular hardware platform provided by the one or more computing systems, and wherein the platform-independent instructions comprise instructions that are not native to or executable by any particular hardware platform provided by the one or more computing systems;
   selecting, from the one or more computing systems, a computing system to perform the at least one computational task;
   providing, by the selected computing system, a container in which to perform the at least one computational task;
   obtaining, by the selected computing system, in the runtime environment, platform-dependent instructions that have been converted from the platform-independent instructions, wherein the platform-dependent instructions have a format that is specific to a hardware platform provided by the selected computing system, and wherein the platform-dependent instructions comprise instructions that are native to and executable by the selected computing system;
   prior to execution of the platform-dependent instructions, configuring the container, wherein configuring the container comprises applying one or more security controls to the container, the one or more security controls being configured to restrict access of the container to only a group of resources provided by the selected computing system; and
   executing, by the selected computing system and in the container, in the runtime environment, the platform-dependent instructions to perform the at least one computational task.

2. The method of claim 1, wherein selecting the computing system to perform the at least one computational task comprises selecting the computing system based on one or more resources of the hardware platform provided by the computing system.

3. The method of claim 1,
   wherein the selected computing system includes one or more specialized processing units,
   wherein the format of the platform-independent instructions is not specific to the one or more specialized processing units,
   wherein the format of platform-dependent instructions is specific to the one or more specialized processing units, and
   wherein executing the platform-dependent instructions to perform the at least one computational task comprises executing, by the one or more specialized processing units, the platform-dependent instructions.

4. The method of claim 1,
   wherein the container comprises an operating system level virtualization (OSLV) container, and
   wherein providing the container in which to perform the at least one computational task comprises one of the following:
   creating the container; or
   selecting the container from a group of pre-created containers provided by the selected computing system.

5. The method of claim 1, wherein obtaining the platform-dependent instructions comprises compiling, by the selected computing system, the platform-independent instructions to generate the platform-dependent instructions.

6. The method of claim 1, wherein the software package comprises a first software package that is associated with a first software application, wherein the at least one computational task comprises at least one first computational task, wherein the selected computing system comprises a first selected computing system, wherein the platform-independent instructions comprise a first group of platform-independent instructions, wherein the platform-dependent instructions comprise a first group of platform-dependent instructions, wherein the container comprises a first container, and wherein the method further comprises:
   in the cloud computing platform, identifying, in the runtime environment, a second software package that is associated with a second software application, wherein the second software package includes a second group of platform-independent instructions that are configured to perform at least one second computational task and that are compiled from application source code associated with the second software application, and wherein the second group of platform-independent instructions have a format that is not specific to any particular hardware platform provided by the one or more computing systems, and wherein the second group of platform-independent instructions comprise instructions that are not native to or executable by any particular hardware platform provided by the one or more computing systems;
   selecting, from the one or more computing systems, a second computing system to perform the at least one second computational task;
   providing, by the second selected computing system, a second container in which to perform the at least one second computational task;
   obtaining, by the second selected computing system, in the runtime environment, a second group of platform-dependent instructions that have been converted from the second group of platform-independent instructions, wherein the second group of platform-dependent instructions have a format that is specific to a hardware platform provided by the second selected computing system, and wherein the second group of platform-dependent instructions comprise instructions that are native to and executable by the second selected computing system; and
   executing, by the second selected computing system and in the second container, in the runtime environment, the second group of platform-dependent instructions to perform the at least one second computational task.

7. The method of claim 6,
   wherein the first selected computing system and the second selected computing system comprise the same computing system,
   wherein executing the first group of platform-dependent instructions in the first container and executing the second group of platform-dependent instructions in the second container occur during execution of a single instance of an operating system.

8. The method of claim 6, further comprising:
providing a secure communication mechanism between the first container and the second container, wherein providing the secure communication mechanism comprises applying one or more security restrictions to at least one data flow between the first container and the second container.

9. The method of claim 6,
wherein the first selected computing system is different from the second selected computing system, and
wherein providing the secure communication mechanism comprises providing one or more tunnels between the first container and the second container.

10. A cloud computing platform, comprising:
one or more computing systems comprising one or more hardware processors,
wherein the one or more processors are configured to:
identify, in a runtime environment, a software package that is associated with a software application, wherein the software package includes platform-independent instructions that are configured to perform at least one computational task and that are compiled from application source code associated with the software application, and wherein the platform-independent instructions have a format that is not specific to any particular hardware platform provided by the one or more computing systems, and wherein the platform-independent instructions comprise instructions that are not native to or executable by any particular hardware platform provided by the one or more computing systems;
select, from the one or more computing systems, a computing system to perform the at least one computational task;
provide, by the selected computing system, a container in which to perform the at least one computational task;
obtain, by the selected computing system, in the runtime environment, platform-dependent instructions that have been converted from the platform-independent instructions, wherein the platform-dependent instructions have a format that is specific to a hardware platform provided by the selected computing system, and wherein the platform-dependent instructions comprise instructions that are native to and executable by the selected computing system;
prior to execution of the platform-dependent instructions configure the container wherein configuring the container comprises applying one or more security controls to the container, the one or more security controls being configured to restrict access of the container to only a group of resources provided by the selected computing system; and
execute, by the selected computing system and in the container, in the runtime environment, the platform-dependent instructions to perform the at least one computational task.

11. The cloud computing platform of claim 10, wherein the one or more processors are configured to select the computing system to perform the at least one computational task at least by selecting the computing system based on one or more resources of the hardware platform provided by the computing system.

12. The cloud computing platform of claim 10,
wherein the selected computing system includes one or more specialized processing units,
wherein the format of the platform-independent instructions is not specific to the one or more specialized processing units,
wherein the format of platform-dependent instructions is specific to the one or more specialized processing units, and
wherein the one or more processors are configured to execute the platform-dependent instructions to perform the at least one computational task at least by executing, by the one or more specialized processing units, the platform-dependent instructions.

13. The cloud computing platform of claim 10,
wherein the container comprises an operating system level virtualization (OSLV) container, and
wherein the one or more processors are configured to provide the container in which to perform the at least one computational task at least by one of the following:
creating the container; or
selecting the container from a group of pre-created containers provided by the selected computing system.

14. The cloud computing platform of claim 10, wherein the one or more processors are configured to obtain the platform-dependent instructions at least by compiling, by the selected computing system, the platform-independent instructions to generate the platform-dependent instructions.

15. The cloud computing platform of claim 10, wherein the software package comprises a first software package that is associated with a first software application, wherein the at least one computational task comprises at least one first computational task, wherein the selected computing system comprises a first selected computing system, wherein the platform-independent instructions comprise a first group of platform-independent instructions, wherein the platform-dependent instructions comprise a first group of platform-dependent instructions, wherein the container comprises a first container, and wherein the one or more processors are further configured to:
identify, in the runtime environment, a second software package that is associated with a second software application, wherein the second software package includes a second group of platform-independent instructions that are configured to perform at least one second computational task and that are compiled from application source code associated with the second software application, and wherein the second group of platform-independent instructions have a format that is not specific to any particular hardware platform provided by the one or more computing systems, and wherein the second group of platform-independent instructions comprise instructions that are not native to or executable by any particular hardware platform provided by the one or more computing systems;
select, from the one or more computing systems, a second computing system to perform the at least one second computational task;
provide, by the second selected computing system, a second container in which to perform the at least one second computational task;
obtain, by the second selected computing system, in the runtime environment, a second group of platform-dependent instructions that have been converted from the second group of platform-independent instructions, wherein the second group of platform-dependent instructions have a format that is specific to a hardware platform provided by the second selected computing system, and wherein the second group of platform-dependent instructions comprise instructions that are native to and executable by the second selected computing system; and execute, by the second selected computing system and in the second container, in the runtime environment, the second group of platform-dependent instructions to perform the at least one second computational task.

16. The cloud computing platform of claim 15,
wherein the first selected computing system and the second selected computing system comprise the same computing system,
wherein the one or more processors are configured to execute the first group of platform-dependent instructions in the first container and execute the second group of platform-dependent instructions in the second container during execution of a single instance of an operating system.

17. The cloud computing platform of claim 15, wherein the one or more processors are further configured to:
provide a secure communication mechanism between the first container and the second container at least by applying one or more security restrictions to at least one data flow between the first container and the second container.

18. The cloud computing platform of claim 15,
wherein the first selected computing system is different from the second selected computing system, and
wherein the one or more processors are configured to provide the secure communication mechanism at least by providing one or more tunnels between the first container and the second container.

19. A non-transitory computer-readable storage medium comprising instructions that, when executed, cause a cloud computing platform comprising one or more computing systems to perform operations comprising:
identifying, in a runtime environment, a software package that is associated with a software application, wherein the software package includes platform-independent instructions that are configured to perform at least one computational task and that are compiled from application source code associated with the software application, and wherein the platform-independent instructions have a format that is not specific to any particular hardware platform provided by the one or more computing systems, and wherein the platform-independent instructions comprise instructions that are not native to or executable by any particular hardware platform provided by the one or more computing systems;
selecting, from the one or more computing systems, a computing system to perform the at least one computational task;
providing, by the selected computing system, a container in which to perform the at least one computational task;
obtaining, by the selected computing system, in the runtime environment, platform-dependent instructions that have been converted from the platform-independent instructions, wherein the platform-dependent instructions have a format that is specific to a hardware platform provided by the selected computing system, and wherein the platform-dependent instructions comprise instructions that are native to and executable by the selected computing system;
prior to execution of the platform-dependent instructions, configuring the container, wherein configuring the container comprises applying one or more security controls to the container, the one or more security controls being configured to restrict access of the container to only a group of resources provided by the selected computing system; and
executing, by the selected computing system and in the container, in the runtime environment, the platform-dependent instructions to perform the at least one computational task.

20. The non-transitory computer-readable storage medium of claim 19, wherein selecting the computing system to perform the at least one computational task comprises selecting the computing system based on one or more resources of the hardware platform provided by the computing system.

21. The non-transitory computer-readable storage medium of claim 19,
wherein the selected computing system includes one or more specialized processing units,
wherein the format of the platform-independent instructions is not specific to the one or more specialized processing units,
wherein the format of platform-dependent instructions is specific to the one or more specialized processing units, and
wherein executing the platform-dependent instructions to perform the at least one computational task comprises executing, by the one or more specialized processing units, the platform-dependent instructions.

22. The non-transitory computer-readable storage medium of claim 19,
wherein the container comprises an operating system level virtualization (OSLV) container, and
wherein providing the container in which to perform the at least one computational task comprises one of the following:
creating the container; or
selecting the container from a group of pre-created containers provided by the selected computing system.

23. The non-transitory computer-readable storage medium of claim 19, wherein obtaining the platform-dependent instructions comprises compiling, by the selected computing system, the platform-independent instructions to generate the platform-dependent instructions.

24. The non-transitory computer-readable storage medium of claim 19, wherein the software package comprises a first software package that is associated with a first software application, wherein the at least one computational task comprises at least one first computational task, wherein the selected computing system comprises a first selected computing system, wherein the platform-independent instructions comprise a first group of platform-independent instructions, wherein the platform-dependent instructions comprise a first group of platform-dependent instructions, wherein the container comprises a first container, and wherein the operations further comprise:
in the cloud computing platform, identifying, in the runtime environment, a second software package that is associated with a second software application, wherein the second software package includes a second group of platform-independent instructions that are configured to perform at least one second computational task and that are compiled from application source code associated with the second software application, and wherein the second group of platform-independent instructions have a format that is not specific to any particular hardware platform provided by the one or more computing systems, and wherein the second group of platform-independent instructions comprise instructions that are not native to or executable by any particular hardware platform provided by the one or more computing systems;

selecting, from the one or more computing systems, a second computing system to perform the at least one second computational task;

providing, by the second selected computing system, a second container in which to perform the at least one second computational task;

obtaining, by the second selected computing system, in the runtime environment, a second group of platform-dependent instructions that have been converted from the second group of platform-independent instructions, wherein the second group of platform-dependent instructions have a format that is specific to a hardware platform provided by the second selected computing system, and wherein the second group of platform-dependent instructions comprise instructions that are native to and executable by the second selected computing system; and executing, by the second selected computing system and in the second container, in the runtime environment, the second group of platform-dependent instructions to perform the at least one second computational task.

25. The non-transitory computer-readable storage medium of claim 24, wherein the first selected computing system and the second selected computing system comprise the same computing system, wherein executing the first group of platform-dependent instructions in the first container and executing the second group of platform-dependent instructions in the second container occur during execution of a single instance of an operating system.

26. The non-transitory computer-readable storage medium of claim 24, wherein the operations further comprise:

providing a secure communication mechanism between the first container and the second container, wherein providing the secure communication mechanism comprises applying one or more security restrictions to at least one data flow between the first container and the second container.

27. The non-transitory computer-readable storage medium of claim 24, wherein the first selected computing system is different from the second selected computing system, and wherein providing the secure communication mechanism comprises providing one or more tunnels between the first container and the second container.

* * * * *